United States Patent
Suresh et al.

(10) Patent No.: US 8,355,893 B2
(45) Date of Patent: Jan. 15, 2013

(54) METHOD AND SYSTEM FOR ANALYSIS AND SHAPE OPTIMIZATION OF PHYSICAL STRUCTURES USING A COMPUTERIZED ALGEBRAIC DUAL REPRESENTATION IMPLICIT DIMENSIONAL REDUCTION

(75) Inventors: Krishnan Suresh, Madison, WI (US); Kavous Jorabchi, Madison, WI (US); Josh Danczyk, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 961 days.

(21) Appl. No.: 12/333,743

(22) Filed: Dec. 12, 2008

(65) Prior Publication Data
US 2010/0153077 A1    Jun. 17, 2010

(51) Int. Cl.
*G06F 17/50* (2006.01)
(52) U.S. Cl. .................... 703/1; 703/6; 700/98
(58) Field of Classification Search .............. 703/1
See application file for complete search history.

(56) References Cited

U.S. PATENT DOCUMENTS

| | | | | |
|---|---|---|---|---|
| 4,858,146 | A * | 8/1989 | Shebini .................. | 703/1 |
| 6,901,809 | B2 * | 6/2005 | Dong et al. .............. | 73/789 |
| 6,941,250 | B1 * | 9/2005 | Nishiwaki et al. ........ | 703/1 |
| 7,734,652 | B2 * | 6/2010 | Tamayo et al. ............ | 707/792 |
| 7,751,917 | B2 * | 7/2010 | Rees et al. ............... | 700/97 |
| 7,987,073 | B2 * | 7/2011 | Washizawa .............. | 703/2 |

OTHER PUBLICATIONS

Krysl et al, "Dimensional Model Reduction in Non-Linear Finite Element Dynamics of Solids and Structures", International Journal for Numerical Methods in Engineering, 51, pp. 479-504, 2001.*
Lall et al, "Structure-Preserving Model Reduction of Mechanical Systems", Dyn. Stab. Syst., 2000.*
Vinot et al, "Shape Optimization of Thin-Walled Beam-Like Structures", Thin-Walled Structures, 39, pp. 611-630, 2001.*
Weickum et al, "Multi-point Extended Reduced Order Modeling for Design Optimization and Uncertainty Analysis", 2nd AIAA Multidisciplinary Design Optimization Specialist Conference, May 1-4, 2006.*
Donaghy et al, "Dimensional Reduction of Analysis Models", 5th International Meshing Roundtable, Sandia National Laboratories, pp. 307-320, 1996.*
Suresch, Krishnan, "Generalization of the Mid-Element Based Dimensional Reduction", Transactions of the ASME, vol. 3, Dec. 2003.*
Bournival et al, "A Mesh-Geometry Based Approach for Mixed-Dimensional Analysis", In: International Meshing Roundtable, Pittsburgh, USA, 2008.*
Kerschen et al, "On the Exploitation of Chaos to Build Reduced Order Models", Comput. Methods Appl. Mech. Engrg. 192, pp. 1785-1795, 2003.*

* cited by examiner

*Primary Examiner* — Mary C Jacob
(74) *Attorney, Agent, or Firm* — Boyle Frederickson, S.C.

(57) ABSTRACT

A method and system for simulating and analyzing the behavior of a structural component of a computerized model in response to a simulated event to determine an optimized shape for the component is disclosed. The shape is optimized using an implicit dimensional reduction rather than an explicit geometric replacement by discarding data of a 3D discretization that has little or no bearing on the performance of the component to a simulated event. The reduced dataset is then collapsed onto a lower dimension projection that is applied over a force vector that is representative of the simulated event to determine the behavior of the component to the simulated event. Optimization tools may then be used to modify the physical attributes of the component and performance of the component once again simulated until an optimized component is determined.

16 Claims, 6 Drawing Sheets ions that are difficult to automate. For example, the 3D
METHOD AND SYSTEM FOR ANALYSIS AND SHAPE OPTIMIZATION OF PHYSICAL STRUCTURES USING A COMPUTERIZED ALGEBRAIC DUAL REPRESENTATION IMPLICIT DIMENSIONAL REDUCTION

REFERENCE TO GOVERNMENT GRANT

This invention was made with United States government support awarded by the following agencies: NSF 0726635, 0745398. The United States government has certain rights in this invention.

FIELD OF THE INVENTION

The present invention relates generally to computer modeling of structures and, more particularly, to a method and system of analysis and shape optimization of physical structures using a computerized algebraic dual representation implicit dimensional reduction process rather than an explicit geometrical reduction. In one particular application, the invention applies to computer modeling and optimization of thin physical structures.

BACKGROUND OF THE INVENTION

Finite Element Analysis (FEA) is a software modeling tool used by design engineers to pre-test a virtual (computerized) model prior to physical construction of the model. In general, FEA tools are used to assess the behavior or performance of a computer model, or element of the model, in response to agent. To do so, the FEA tools break down a 3D model into multiple elements. The mathematical problem, representative of the agent, is applied to each element and solved, and then the elements are then "assembled" together to show the net effect on the entire model of the agent. If the results of the first analysis show that a bracket will fail under a give load, then the model is often thickened in that area. In order to test the "thickened" bracket, the entire mesh and the analysis is rerun to assess the performance. This is referred to as shape optimization, and is an integral part of engineering design.

In general, shape optimization is synthesis of computer aided design and computer aided engineering to analyze, refine, and optimize the geometry of engineering components with minimal human input. One of the problems of conventional shape optimization processes is that the evolving geometry may become slender, e.g., beam or plate-like. When an artifact, i.e., structural element, or portions of it, becomes slender, conventional 3D computational processes, such as finite element analysis, become less practical. More particularly, the computational demands of the finite element analysis for such slender elements cause a significant slowdown and, in some case, inaccurate results. Thus, while conventional 3D finite element analysis are effective for analyzing solid elements, it is less than ideal for slender elements, such as slender plates and slender beams.

More particularly, it is well known that for slender elements or structures, it is necessary to carry out a geometric dimensional reduction prior to finite element analysis. Explicit geometric reduction entails replacing the 3D slender region of the element with an equivalent 2D plate or 1D beam. Although the underlying mathematics is well understood in the art, geometric reduction involves many mathematical operations that are difficult to automate. For example, the 3D slender region must be removed from the parent body via a computer aided design operation. Then, the cross-sectional data, such as area, moment of inertia, etc. must be extracted from the slender region. Thereafter, an appropriate lower dimensional geometric entity must be constructed and a stiffness matrix for the slender region and a stiffness matrix for the remaining 3D region must be assembled separately, which may involve disparate computer aided engineering systems. The matrices must then be suitably coupled and the global multidimensional system must be analyzed and, finally, the resulting solution must be post-processed to extract quantities or interest from regions of varying dimensions.

One proposed process for automating the aforementioned series of steps relies on the medial axis concept; however, medial axis computation is also known to be expensive and difficult to implement, especially in a 3D environment.

The issues become more challenging and problematic since some of the aforementioned computer aided design operations must be undone if the slender region grows back into a full 3D region. Thus, "switching back and forth" between 3D analysis and dimensionally reduced analysis is not only time consuming, but can be cumbersome and thus impractical.

The design of microcantilevers is particularly illustrative of the hurdles associated with conventional designing of thin components or components having thin or slender portions. Microcantilevers are high aspect ratio beams, made typically from silicon or silicon nitride, with thicknesses in the order of a few micrometers. Due to their relatively small size, microcantilevers can detect minute changes in the environment; for example, when properly designed, they can measure relative humidity, temperature, pressure, flow, viscosity, sound, natural gas, mercury vapor, or ultraviolet and infrared radiation, and can also be used as biosensors-devices to detect DNA sequences and proteins.

Microcantilevers are designed through a highly iterative and tedium process that relies heavily on computation methods such as 3D finite element analysis (FEA) and ID beam analysis. While frequently used, such methods are often ill-suited for microcantilever design as well as other structures having high aspect ratios. That is, it is known that 3D FEA results in poor quality finite elements for structures having high aspect ratios, i.e., $L \gg W$. Generally, it has been found that conventional 3D FEA underestimates the displacement of the thin part and overestimates the stress of the thin part in response to a tip-load, for example. As shown in FIG. 1, a conventional 3D FEA generally involves the construction of a 3D computer model 10, followed by a 3D mesh analysis 12, which is then followed by assembling and solving of the finite elements 14.

Conventional ID beam analysis is also not well suited for thin parts, such as microcantilevers. Conventional ID beam analysis, as shown in FIG. 2, generally consists of the generation of a 3D computer model 16, representation of the 3D component as a ID element 18, and then the model, as modified by the modified component, is meshed, assembled, and solved 20 under the constraints of the Euler-Bernoulli beam theory 22. ID beam analysis poses numerous automation challenges in that it is hard to integrate within a 3D CAD environment. Specifically, as microcantilevers become increasingly complex, computing the ID beam geometry from a 3D CAD model can be cumbersome and difficult to automate. As noted above, explicit beam geometry construction entails modification of the 3D CAD model, and can therefore lead to product inconsistency. Further, coupling the 1D geometry to 3D structural elements is non-trivial and requires case-by-case programming. Finally, post-processing and visualizing the 1D analysis results within the 3D environment defeats the very purpose of 3D modeling.

A number of shape optimization techniques have been developed that seek to overcome the drawbacks of conventional techniques and especially those encountered during the design of microcantilevers and other slender/thin parts. However, these proposed techniques also suffer from shortcomings. For instance, one proposed technique is a solid-shell analysis. Solid-shell analysis, however, entails a priori information of the finite element mesh and therefore requires manual interaction. Another proposed technique, generally referred to as "reduced integration", lead to degenerate hourglass modes and must therefore be stabilized, often on a case-by-case basis. Several hybrid/mixed variational methods have been proposed; however, these methods have been found to be computational inefficient compared to standard displacement based methods. Moreover, none of the aforementioned proposed techniques are believed to deliver the same accuracy as explicit geometric reduction.

Therefore, there remains a need in the art for a shape optimization that offers the accuracy of explicit geometric reduction but that is computationally efficient and thus workable for 3D slender parts.

SUMMARY OF THE INVENTION

The present invention is directed to a method and system for simulating and analyzing the behavior of a structural component of a computerized model. The invention can be generally characterized as an implicit dimensional reduction method where the reduction is achieved through an algebraic process. As will be shown in the description hereinafter, the method is computationally efficient yet offers the accuracy of conventional explicit reduction methods. The invention may be automated and integrated within a shape optimization process. In this regard, the invention can be used with conventional 3D finite element analysis software tools and packages.

It is therefore an object of the invention to provide a design tool for analyzing and optimizing slender and potentially slender elements with a 3D computer aided design, finite element analysis environment.

It is a further object of the invention to provide a process for iteratively determining if an element that is to be optimized qualifies as a 3D solid, 3D beam, or 3D plate and then applying a corresponding reduction process to analyze the behavior of the element.

It is yet another object of the invention to provide a shape optimization process suitable for analyzing design elements or parts having both slender and non-slender regions.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION OF THE INVENTION

The present invention is generally directed to a computerized, iterative process for optimizing the shape of physical structures based on the simulated response of a computerized model of the physical structures to a simulated event, e.g., point load. While the invention is not so limited, the invention will be described with respect to the optimization of a microcantilever. As will be appreciated, the present invention is particularly applicable for the optimization of high aspect ratio structures, such as beams and other "thin" structures or structures having "thin" portions.

As will explained in greater detail hereinafter, the present invention provides a dual-representation structural analysis process that offers the geometric flexibility and generality of 3D FEA and the computational efficiency and accuracy of 1D beam analysis. In general, the inventive process involves the capturing of the geometry of the structure via an arbitrary 3D finite element mesh and the capturing of the physics of the structure via classic beam theory. Consequently, one of the principal advantages of the present invention is that analysis and optimization can be carried out efficiently and accurately within a standard 3D CAD environment.

Figure 1:
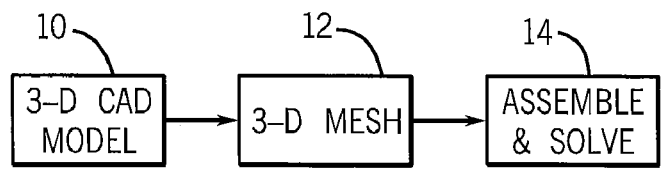
FIG. 1 is a flow chart setting forth the steps of a conventional 3D finite element analysis.
Figure 2:
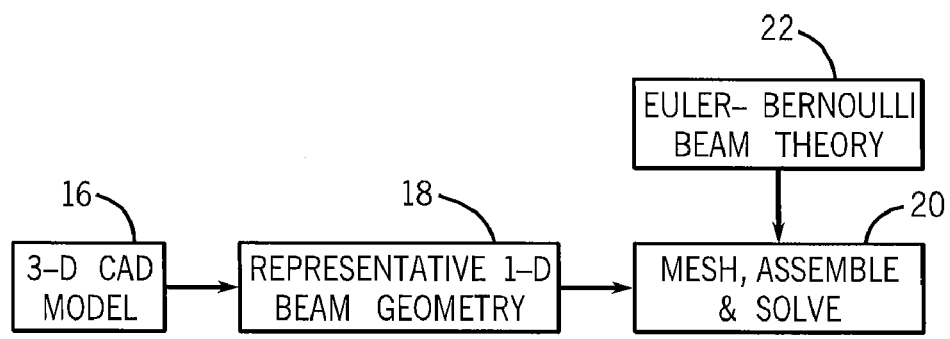
FIG. 2 is a flow chart setting forth the steps of a conventional 1D beam analysis.
Figure 3:
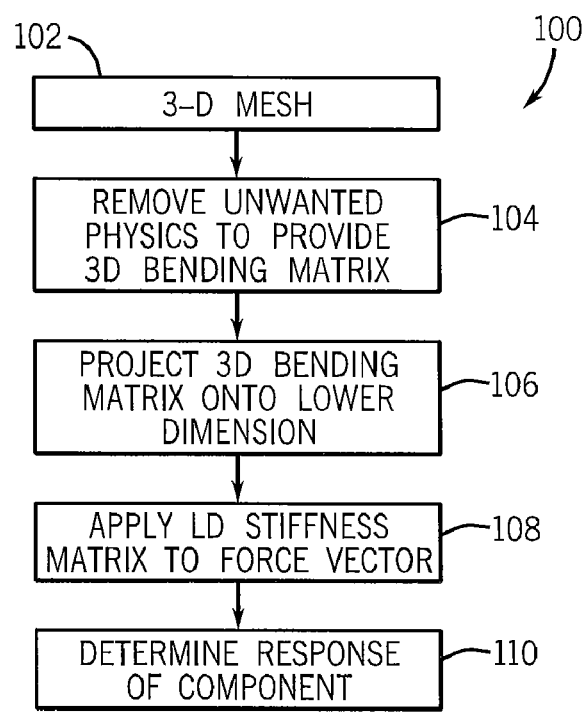
FIG. 3 is a flow chart setting forth the steps of a dual representation analysis according to one aspect of the invention.
Figure 4:
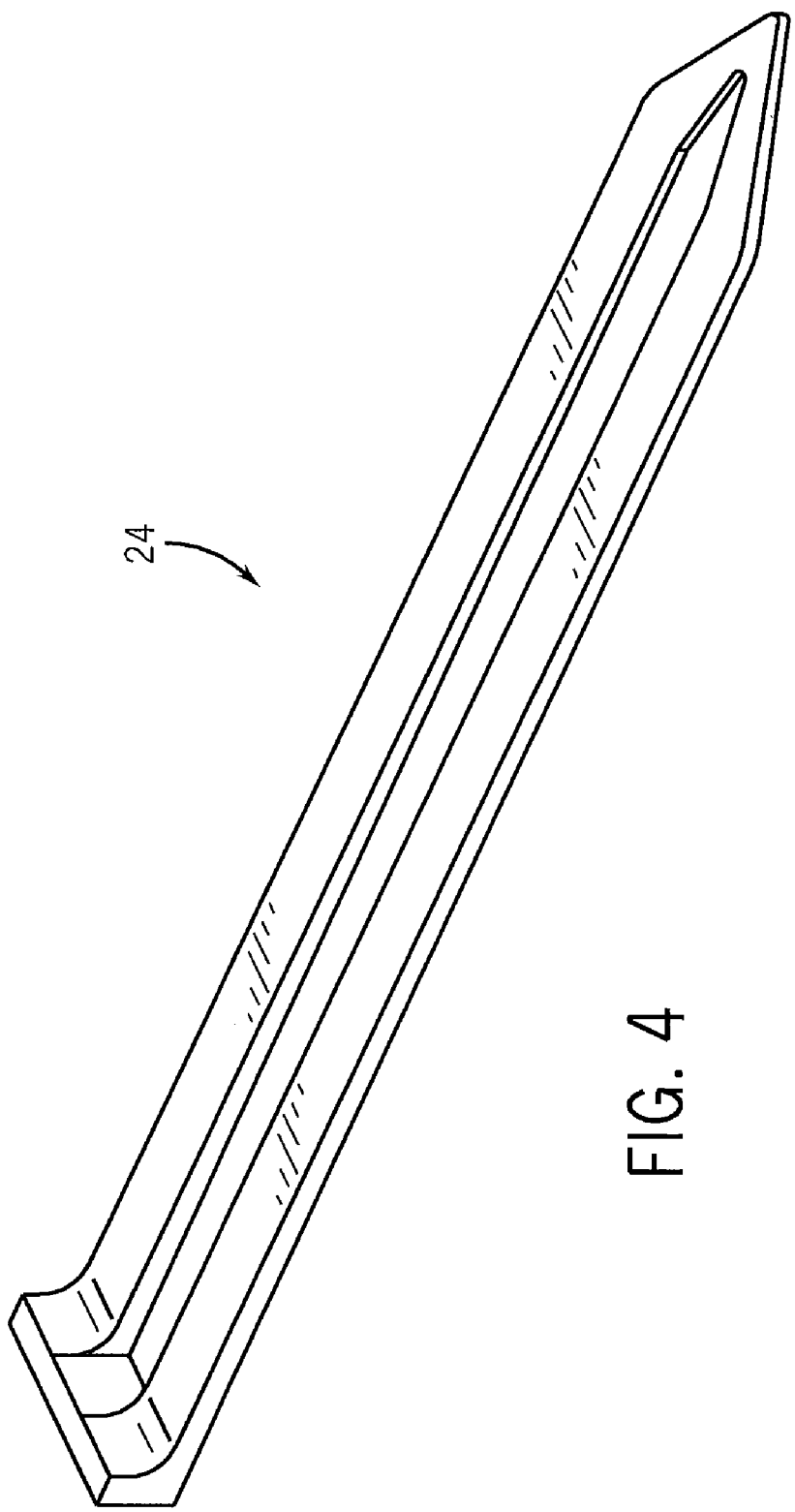
FIG. 4 is an isometric view of a microcantilever whose response to a simulated parameter can be determined using the dual representation analysis shown generally at FIG. 3.
Figure 5:
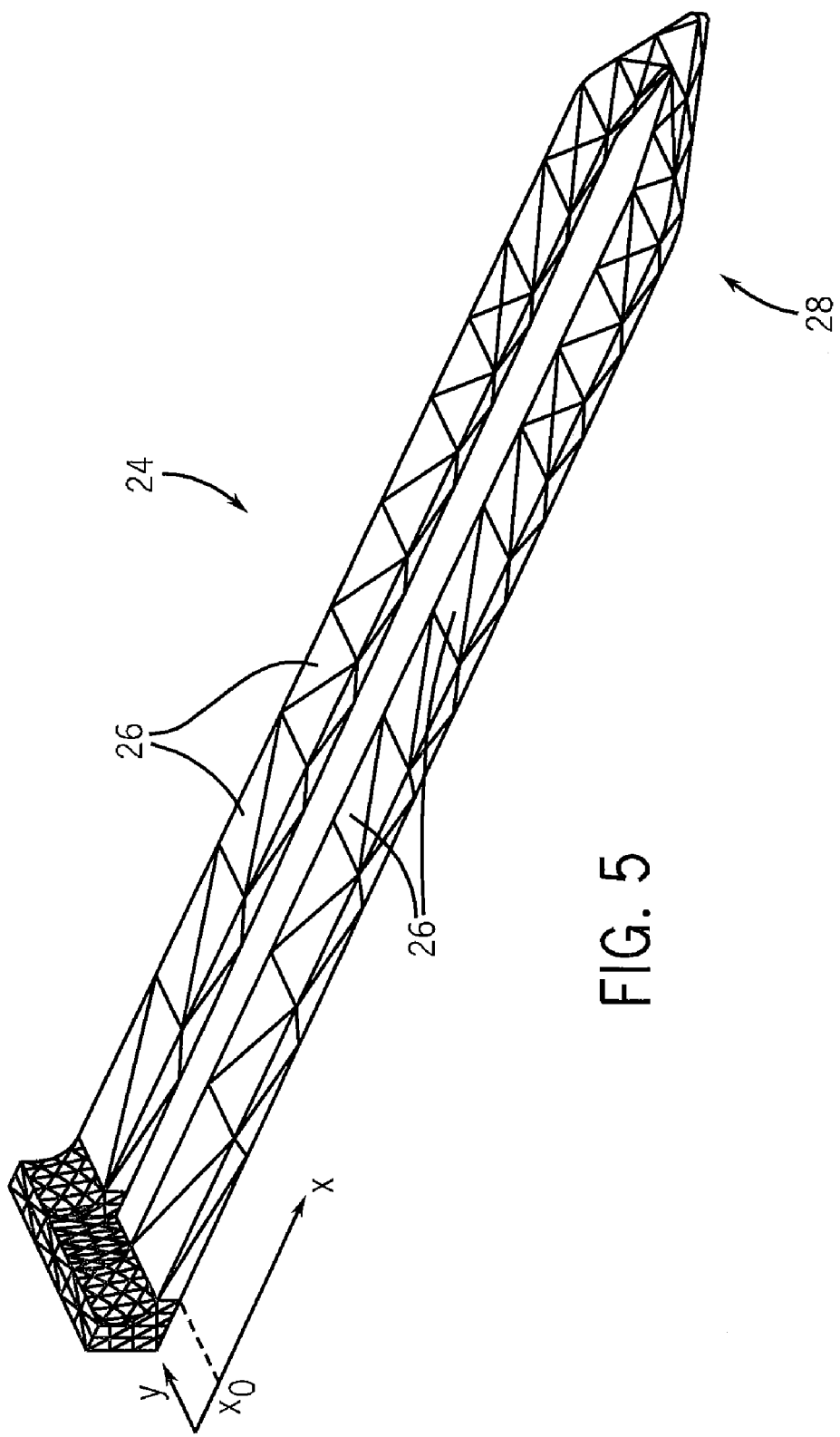
FIG. 5 is an isometric view of a the microcantilever shown in FIG. 4 but shown composed of a plurality of finite elements.

Referring now to FIG. 3, in general, the present invention is directed to a process 100 in which a 3D discretization or mesh is performed for a slender structure, such as a microcantilever at block 102. The 3D discretization, in effect, breaks down the slender structure into a multitude of discrete elements. For example, referring to FIG. 5, the illustrative microcantilever 24 is composed of a number of tetrahedral shaped finite elements 26. As also shown in FIG. 4, for this illustrative example, the elements 26 in the thin region 28 are of relatively poor quality. The 3D discretization effectively provides a 3D dataset represented by the following equation:

$$K^{3D} \equiv \int_\Omega B^T D B \, d\Omega \quad \text{(Eqn. 1)}$$

$$B^T = \begin{bmatrix} N_{,x} & 0 & 0 & N_{,y} & N_{,z} & 0 \\ 0 & N_{,y} & 0 & N_{,x} & 0 & N_{,z} \\ 0 & 0 & N_{,z} & 0 & N_{,x} & N_{,y} \end{bmatrix}$$

$$D = \frac{E}{(1+v)(1-2v)}$$

-continued $$\begin{bmatrix} 1-v & v & v & 0 & 0 & 0 \\ v & 1-v & v & 0 & 0 & 0 \\ v & v & 1-v & 0 & 0 & 0 \\ 0 & 0 & 0 & (1-2v)/2 & 0 & 0 \\ 0 & 0 & 0 & 0 & (1-2v)/2 & 0 \\ 0 & 0 & 0 & 0 & 0 & (1-2v)/2 \end{bmatrix};$$

where:

K3D is the 3-D stiffness matrix, B is the matrix of finite element shape functions, Nx,Ny and Nz are finite element shape functions, E is the Young's modulus, v is the Poisson's ratio, and D is the material matrix.

The 3D dataset is representative of the various design characteristics of the component, which in this example, is the microcantilever shown in FIG. 4. In this regard, some of the data contained in the 3D dataset has little to no impact on the behavior of the microcantilever to a simulated parameter, such as tip load. Examples of such characteristics that can be neglected include the strain energy in the thickness direction of the cantilever. Thus, the "unwanted" data is removed from the 3D dataset at block 104. That is, a reduced dataset is generated at block 104 containing only the data that has a bearing on the behavior of the component in response to the simulated parameter. It will be appreciated that the data included in the reduced dataset may differ as different parameters or events are simulated. The reduced dataset constitutes a 3D bending stiffness matrix, as defined by Equation 2 below.

$$K^{3D:B} \equiv \int_\Omega N_{,x}^T E N_{,x} d\Omega; \qquad \text{(Eqn. 2)}$$

where:

K3D:B is the 3-D bending stiffness matrix, Nx is finite element shape function in the direction of the beam, and E is the Young's modulus.

The 3D bending stiffness matrix is then collapsed onto a lower dimension, e.g., 2D or 1D, projection at block 106 to yield a lower dimension stiffness matrix, which can be numerically represented by Equation 3 below.

$$K^{DR:B} = P_u^T K^{3D:B} P_u \qquad \text{(Eqn. 3);}$$

where:

KDR:B is the reduced bending stiffness matrix, K3D:B is the 3D bending stiffness matrix from Eqn (2), and Pu is the projection matrix corresponding to the Euler-Bernoulli kinematic theory for thin beams.

The stiffness matrix is then applied on a force vector at block 108 to, in effect, subject the component to the simulated parameter. In this regard, the "physics" of the component unassociated with response to the simulated parameter are discounted, the simulated parameter, as represented by the force vector, is applied, and the response of the component can then be evaluated at block 110. That is, the "shape" of the deflected beam in response to the simulated parameter, e.g., tip load, is obtained.

Figure 6:
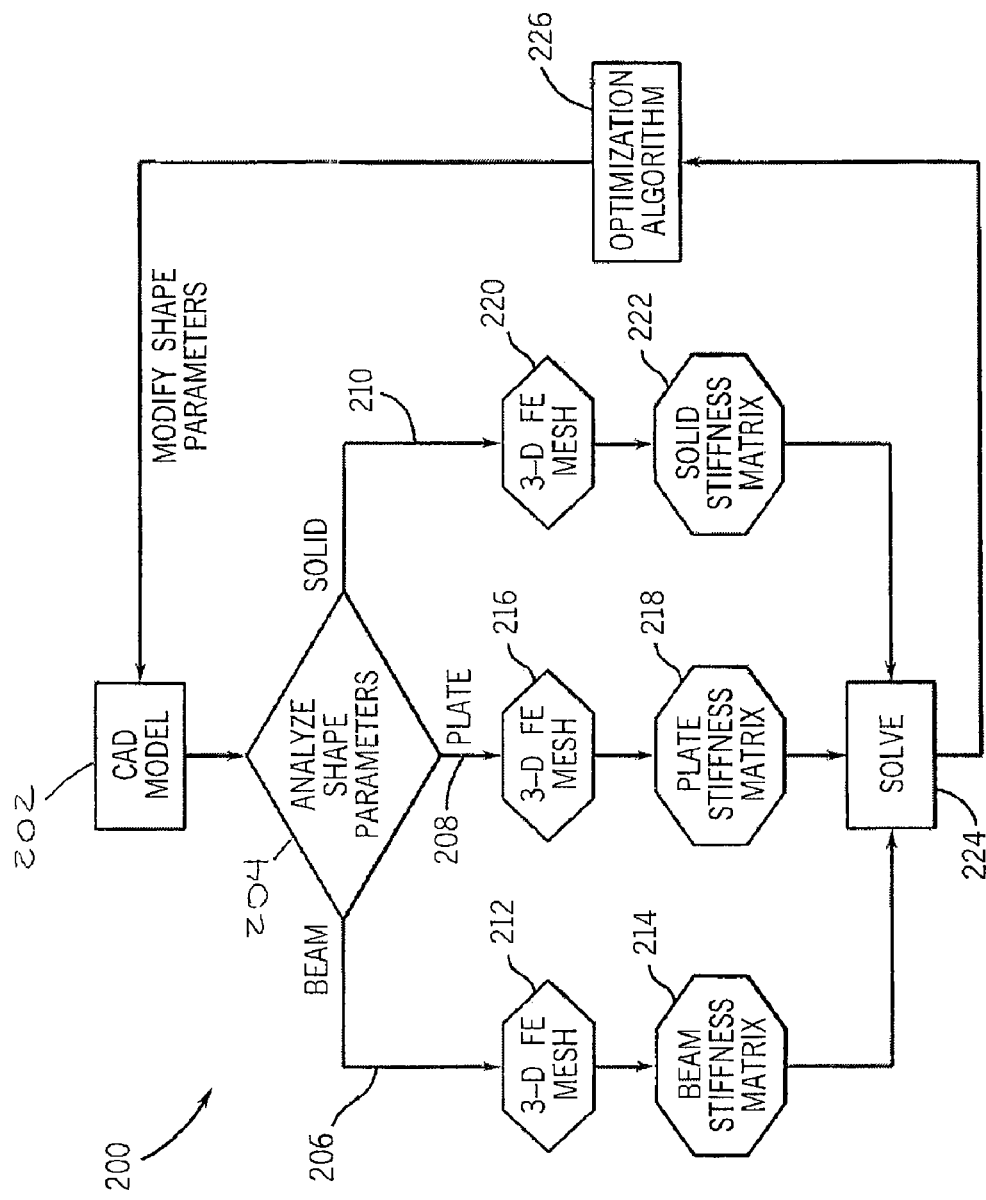
FIG. 6 is a flow chart setting forth the steps of an iterative process for shape optimization according to one aspect of the invention.

In a preferred embodiment, the present invention is applied as iterative process to optimize the shape of a component within certain prescribed constrains. Thus, for the microcantilever example discussed above, the shape of the "virtual" component would be changed and the steps set forth in FIG. 3 repeated until the response, e.g., deflection, met a design goal, as illustrated in FIG. 6.

More particularly, it is recognized that as the shape parameters are modified iteratively for a particular component under study, the component may become more beam-like, more plate-like, or more solid-like. The iterative process 200, shown in FIG. 6, is executed regardless of the characterization of the shape of the component; however, the suitable stiffness matrix varies depending upon the shape of the component. In this regard, process 200 begins with meshing or otherwise accessing a meshed component that has been modeled using a computer aided design program at block 202. The shape parameters of the component are then analyzed at block 204. If the component is a beam, branch 206 of the process is followed. If the component is a plate, then branch 208 of the process is followed. And, if the component is a solid, then branch 210 of the process is followed. While characterizing the shape of the component can be determined to various guidelines, in a preferred embodiment:

$$\left(\frac{H}{L} < 0.1\right) \text{ and } \left(\frac{W}{L} < 0.1\right) \Rightarrow \text{Beam} \qquad \text{(Eqn. 4)}$$

$$\left(\frac{H}{L} < 0.1\right) \text{ and } \left(\frac{W}{L} > 0.1\right) \Rightarrow \text{Plate}$$

$$\left(\frac{H}{L} \geq 0.1\right) \text{ and } \left(\frac{W}{L} \geq 0.1\right) \Rightarrow \text{Solid.}$$

If the component is a beam, a 3D finite element discretization is performed at block 212 and a beam stiffness matrix is determined at block 214. If the component is a plate, a 3D finite element discretization is performed at block 216 and a plate stiffness matrix is derived at block 218. If the component is a block, a 3D finite element discretization is performed at block 220 and a solid stiffness matrix is derived at block 222. Each matrix is then solved at block 224 and a suitable shape optimization algorithm applied at block 226 to determine if the shape has been optimized given certain predefined design constraints and, if not, what changes in the design of the component should be evaluated next. Thus, regardless of the shape of the component, a suitable stiffness matrix is derived and applied to a force vector, i.e., block 224, to determine the performance characteristics of the component. Process 200 is iteratively performed until the shape of the component has been optimized based on certain design constraints and the simulated behavior of the component.

The beam stiffness matrix is numerically represented in Equation 3 and the plate stiffness matrix is numerically represented in Equation 7 set forth below:

$$K^{DR:P} = [P_u^T \; P_v^T] K^{3D:P} \begin{bmatrix} P_u \\ P_v \end{bmatrix}; \qquad \text{(Eqn. 5)}$$

where:

KDR:P is the reduced plate stiffness matrix, K3D:P is the 3D plate stiffness matrix, and Pu is the projection matrix corresponding to the Kirchoff-Love kinematic theory for thin plates.

Figure 7:
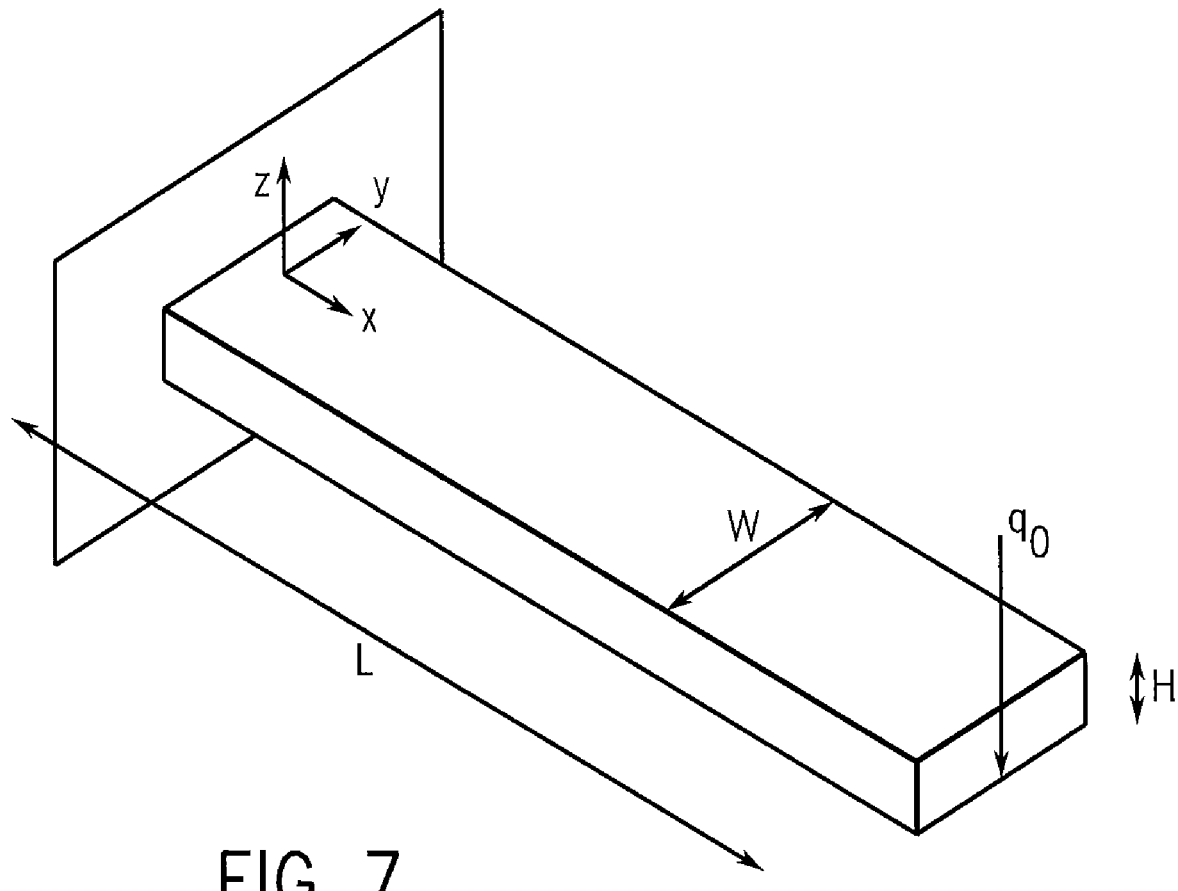
FIG. 7 is an isometric view of an exemplary cantilever whose shape is optimized using the iterative process shown in FIG. 6.
Figure 8:
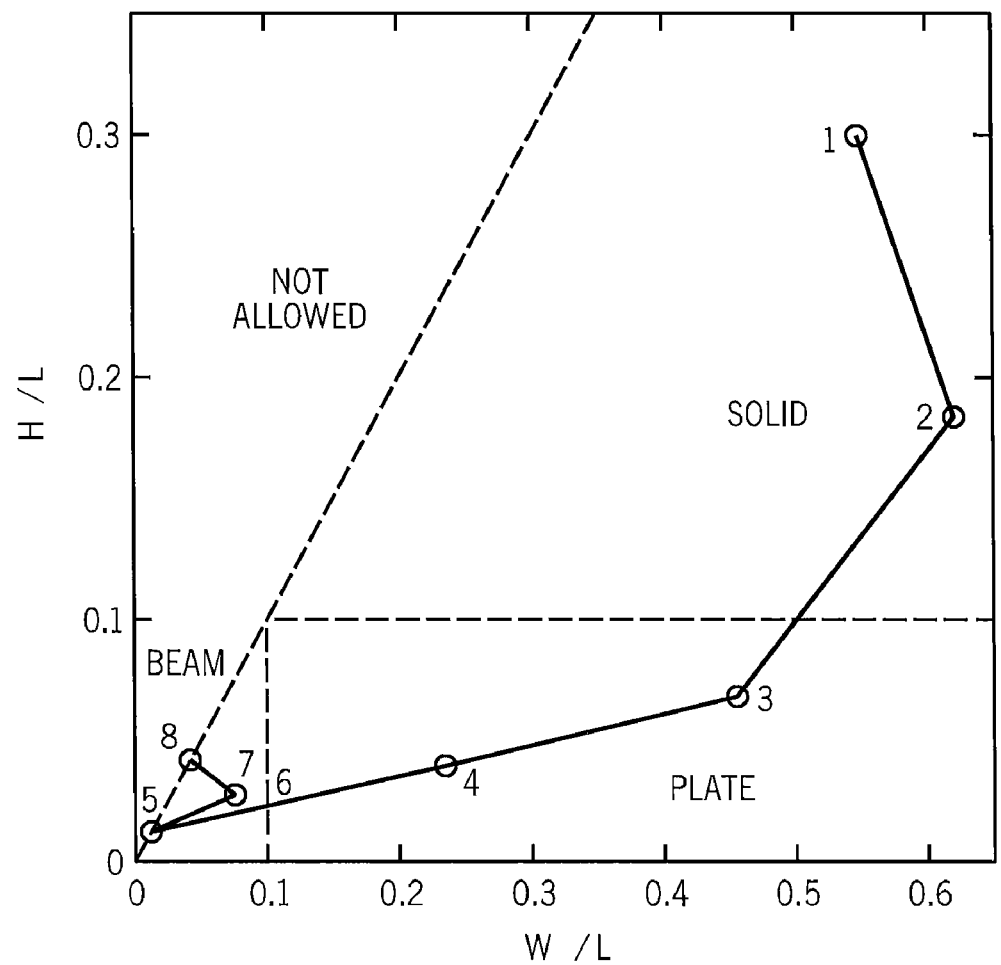
FIG. 8 shows a shape optimization trajectory derived during optimizing the shape of the cantilever shown in FIG. 7.

An example application of the present invention will be described. The purpose of the following example is to optimize the shape of the cantilever solid shown in FIG. 7 assuming a tip load of 1N. The shape variables are the width W and height H, while the length is kept constant at L=1. It should be noted that as the width and height are varied, the 3D artifact can potentially behave either as a solid, beam or a plate. To distinguish a solid from a beam and a plate, the shape characterization equations described above are used. In this example, the objective is to minimize the volume of the beam subject to vibration, stress and shape constraints. The exact solution can be shown to be W*=H*=0.0393, but FIG. 8 illustrates a trajectory of the shape of the component as the process, schematically shown in FIG. 6, was iteratively executed. Thus, as the process was iteratively applied, the shape of the component moved from a solid to a plate, and then from a plate to a beam. The optimization of the shape was achieved without explicit geometric reduction.

It is possible for a component to have beam, plate, and solid portions. For such a component, there is a coupling between the associated stiffness matrices that must be resolved before a mesh can be performed for the entire component. In general, the coupling between a reduced dimension matrix and a 3D matrix can be achieved by imposing displacement continuity on shared nodes over the common interface between the differing regions, which can represented by the following equation:

$$[C_1 \quad C_2] \begin{bmatrix} d^{3D} \\ d^{DR} \end{bmatrix} = 0, \quad \text{(Eqn. 6)}$$

which provide a Lagrangian system:

$$\begin{bmatrix} K^{3D} & 0 & C_1^T \\ 0 & K^{DR} & C_2^T \\ C_1 & C_2 & 0 \end{bmatrix} \begin{Bmatrix} d^{3D} \\ d^{DR} \\ \lambda \end{Bmatrix} = \begin{Bmatrix} q^{3D} \\ q^{DR} \\ 0 \end{Bmatrix}. \quad \text{(Eqn. 7)}$$

Equation 6 can be solved to derive the degrees of freedom for the mesh of the component, as known in the art.

As described herein, the present invention provides a method and system to optimize the shape of physical structures and, in particular, thin or slender parts. It will be appreciated that the present invention may also be applied to physical structures having slender and non-slender portions. It will be appreciated that the present invention is directed to a computer implemented process for optimizing, within prescribed constraints, the shape of a physical structure using a computer aided design and analysis tool. It will thus be appreciated that the present invention may be embodied as a process executed by a computer or in executable code stored on a computer readable storage medium. In addition, the invention may be embodied as a stand-alone software package or as an add-on for an existing computer aided design and/or analysis program or suite. It is understood that programming and additional interfacing steps may be necessary to integrate the invention with existing design programs, but it is believed that such integration can be accomplished with known integration techniques. Moreover, it will be appreciated that the present invention may be embodied as software stored locally on a computer, software accessed in a client-server relationship, in a web-based application, or other known manner.

Many changes and modifications could be made to the invention without departing from the spirit thereof. The scope of these changes will become apparent from the appended claims.

We claim:

1. A method of analyzing behavior of a component of a computerized design model in response to a load, comprising:
    (A) characterize the component as one of a beam, a plate, and a solid from a first ratio of the height and the length of the component and a second ratio of the width and the length of the component;
    (B) performing a 3D finite element discretization of the 3D geometry of the component;
    (C) generating a lower dimension structural element stiffness matrix from the 3D discretization, the stiffness matrix capturing bending stresses and strains of a virtual structural element;
    (D) applying the stiffness matrix on a force vector representative of a simulated load on the virtual structural element; and
    (E) determining a shape of the virtual structural element as deflected by the force vector.

2. The method of claim 1 wherein the 3D finite element discretization includes a 3D finite element mesh.

3. The method of claim 1 wherein generating the stiffness matrix includes removing data elements of the 3D finite element discretization that negligibly impact bending stresses and strains of the virtual structural element to provide a reduced dataset and projecting the reduced dataset onto a reduced projection matrix.

4. A computer readable, non-transitory, storage medium having a computer program thereon representing a set of instructions that when executed by a computer causes the computer to perform a shape optimization of a 3D structural element of a computer model, the structural element having a 3D geometry and physics characterizing the physical response of the 3D structural element to an applied force, wherein the shape optimization is performed by:
    characterizing the 3D structural element as one of a beam, a plate, and a solid from a first ratio of the height and the length of the 3D structural element and a second ratio of the width and the length of the selected 3D structural element;
    discretizing the 3D geometry of the 3D structural element from a 3D finite element mesh, the discretization providing a 3D bending stiffness matrix;
    capturing the physics with a lower dimension structural element analysis, the physics represented in a lower dimension structural element stiffness matrix; and
    applying the lower dimension structural element stiffness matrix on a force vector representative of a force applied to the structural element to determine a simulated response of the structural element to the force.

5. The computer readable, non-transitory, storage medium of claim 4 wherein the set of instructions further causes the computer to couple the lower dimension structural element stiffness matrix and the force vector before determining the simulated response of the structural element to the force.

6. The computer readable, non-transitory, storage medium of claim 5 wherein the set of instructions causes the computer to generate a Lagrangian system that couples the lower dimension structural element stiffness matrix and the force vector and then causes the computer to solve the Langrangian system to derive 3D degrees of freedom for the 3D finite element mesh.

7. The computer readable, non-transitory, storage medium of claim 4 wherein the 3D bending stiffness matrix is representative of non-negligible bending stresses and strains on the structural element.

8. The computer readable, non-transitory, storage medium of claim 4 wherein the lower dimension structural element stiffness matrix is a 1D beam stiffness matrix.

9. The computer readable, non-transitory, storage medium of claim 8 wherein the structural element is a beam-like element.

10. The computer readable, non-transitory, storage medium of claim 4 wherein the lower dimension structural element stiffness matrix is a 2D plate stiffness matrix.

11. The computer readable, non-transitory, storage medium of claim 10 wherein the structural element is a plate-like element.

12. A computerized system for evaluating design changes to a computerized model having a plurality of components, and comprising a computer programmed to:
(a) access the computerized model and select a 3D component of the computerized model whose behavior in response to a simulated parameter is to be evaluated;
(b) characterize the selected 3D component as one of a beam, a plate, and a solid from a first ratio of the height and the length of the 3D selected component and a second ratio of the width and the length of the selected 3D component;
(c) discretize a 3D geometry of the selected 3D component with a 3D finite element discretization to provide a 3D dataset;
(d) identify physical parameters of the 3D component that have a negligible effect on the behavior of the 3D component to the simulated parameter;
(e) remove data from the 3D dataset corresponding to the physical parameters that have a negligible effect on the behavior of the 3D component to the simulated parameter to provide a reduced dataset;
(f) project the reduced dataset onto a lower dimension matrix;
(g) apply the simulated parameter to the lower dimension matrix; and
(h) determine the behavior of the 3D component in response to the simulated parameter.

13. The computerized system of claim 12 wherein the computer is further programmed to iteratively modify the shape of the selected component and execute acts (c) through (h) for each shape modification to determine an optimized shape for the selected 3D component given a set of shape constraints.

14. A method of analyzing behavior of a component of a computerized design model in response to a load, comprising:
(A) characterizing the component as a beam, a plate, or a solid;
(B) performing a 3D finite element discretization of the component;
(C) generating a 1D beam stiffness matrix from the 3D discretization, the beam stiffness matrix capturing bending stresses and strains of a virtual beam;
(D) applying the beam stiffness matrix on a force vector representative of a simulated load on the virtual beam; and
(E) determining a shape of the virtual beam as deflected by the force vector.

15. A computerized system for evaluating design changes to a computerized model having a plurality of components, and comprising a computer programmed to:
(a) access the computerized model and select a 3D component of the computerized model whose behavior in response to a simulated parameter is to be evaluated;
(b) characterize the selected 3D component as one of a beam, a plate, and a solid from a first ratio of the height and the length of the 3D selected component and a second ratio of the width and the length of the selected 3D component;
(c) discretize a geometry of the selected 3D component with a 3D finite element discretization to provide a 3D dataset, the 3D dataset defining a corresponding stiffness matrix;
(d) identify physical parameters of the 3D component that have a negligible effect on the behavior of the 3D component to the simulated parameter;
(e) remove data from the 3D dataset corresponding to the physical parameters that have a negligible effect on the behavior of the 3D component to the simulated parameter to provide a reduced dataset;
(f) project the reduced dataset onto a lower dimension matrix;
(g) apply the simulated parameter to the lower dimension matrix;
(h) determine the behavior of the component in response to the simulated parameter; and
(i) iteratively modify the shape of the selected component and execute acts (c) through (h) for each shape modification to determine an optimized shape for the selected component given a set of shape constraints.

16. The computerized system of claim 15 wherein the computer is programmed to project the lower dimension matrix by applying the reduced dataset on a force vector representative of the simulated parameter.

* * * * *